United States Patent
Jiang et al.

(10) Patent No.: US 12,056,916 B2
(45) Date of Patent: Aug. 6, 2024

(54) DETECTION METHOD, DETECTION DEVICE AND STORAGE MEDIUM

(71) Applicant: CONTEMPORARY AMPEREX TECHNOLOGY CO., LIMITED, Fujian (CN)

(72) Inventors: Guannan Jiang, Fujian (CN); Xi Wang, Fujian (CN); Zhiyu Wang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/204,406

(22) Filed: Jun. 1, 2023

(65) Prior Publication Data
US 2024/0078793 A1 Mar. 7, 2024

Related U.S. Application Data (63) Continuation of application No. PCT/CN2022/117361, filed on Sep. 6, 2022.

(51) Int. Cl.
*G06T 7/00* (2017.01)
*G06V 10/776* (2022.01)

(52) U.S. Cl.
CPC ............ *G06V 10/776* (2022.01); *G06T 7/001* (2013.01); *G06T 2207/30108* (2013.01)

(58) Field of Classification Search
CPC .................. G06V 10/776; G06T 7/001; G06T 2207/30108
See application file for complete search history.

(56) References Cited

U.S. PATENT DOCUMENTS 11,798,250 B2 * 10/2023 Silva ...................... G06T 7/0004
2018/0197714 A1 * 7/2018 Plihal ................. G01N 21/9501
(Continued)

FOREIGN PATENT DOCUMENTS

| CN | 110310260 A | 10/2019 |
| CN | 111311542 A | 6/2020 |

(Continued)

OTHER PUBLICATIONS

International Search Report and Written Opinion mailed on Mar. 22, 2023, received for PCT Application PCT/CN2022/117361, filed on Sep. 6, 2022, 15 pages including English Translation.
(Continued)

*Primary Examiner* — Ping Y Hsieh
(74) *Attorney, Agent, or Firm* — XSENSUS LLP (57) ABSTRACT

Embodiments of the present application provide a detection method, a detection device, and a storage medium. The detection method may comprise: obtaining a to-be-detected image; obtaining a plurality of confidence levels corresponding to a plurality of detection items according to the to-be-detected image; and determining a detection result of the to-be-detected image according to the plurality of confidence levels and a plurality of detection thresholds, where
(Continued)

100

Obtain a to-be-detected image — 110

Obtain a plurality of confidence levels corresponding to a plurality of detection items according to the to-be-detected image — 120

Determine a detection result of the to-be-detected image according to the plurality of confidence levels and a plurality of detection thresholds — 130 the plurality of detection thresholds may be corresponding to the plurality of detection items and may be a non-inferior solution of objective functions of an overkill rate and a missed detection rate, the overkill rate may be the ratio of qualified ones detected as defective, and the missed detection rate may be the ratio of defective ones detected as qualified.

18 Claims, 4 Drawing Sheets

(56) References Cited

U.S. PATENT DOCUMENTS

| | | | | |
|---|---|---|---|---|
| 2018/0218492 | A1* | 8/2018 | Zhang | G06T 7/0006 |
| 2019/0370950 | A1* | 12/2019 | Fang | G06T 11/00 |
| 2020/0394784 | A1* | 12/2020 | Toth | G06T 7/0004 |
| 2021/0304400 | A1* | 9/2021 | Bhate | G06F 18/2148 |
| 2023/0039805 | A1 | 2/2023 | Yu et al. | |
| 2023/0122214 | A1* | 4/2023 | Kernick | G06F 18/217 |
| | | | | 382/141 |

FOREIGN PATENT DOCUMENTS

| | | | |
|---|---|---|---|
| CN | 113378743 | A | 9/2021 |
| CN | 113705672 | A * | 11/2021 |
| CN | 113705672 | A | 11/2021 |
| CN | 214750875 | U | 11/2021 |
| CN | 114330090 | A | 4/2022 |

OTHER PUBLICATIONS

Extended European search report issued on Sep. 29, 2023, in corresponding European patent Application No. 22873953.8, 10 pages.

Wei Zeng et al., "Steel Sheet Defect Detection Based on Deep Learning Method", 2019 Tenth International Conference on Intelligent Control and Information Processing (ICICIP), IEEE, Dec. 14-19, pp. 152-157, total 6 pages.

Mathworks, "gamultiobj Algorithm", Matlab R2022a Documenation, Mar. 15, 2022, total 3 pages.

Qian Tao et al., "Threshold-optimized decision-level fusion and its application to biometrics", Pattern Recognition, Elsevier, GB, vol. 42, No. 5, May 1, 2009, pp. 823-836, total 14 pages.

Huimin Zhao, "A multi-objective genetic programming approach to developing Pareto optimal decision trees", Decision Support Systems, Elsevier, Amsterdam, NL, vol. 43, No. 3, Apr. 1, 2007, pp. 809-826, total 18 pages.

Rodrigo Verschae et al., "Improvement of a Face Detection System by Evolutionary Multi-Objective Optimization", Hybrid Intelligent Systems, 2005. Fifth International Conference on Rio de Janeiro, Brazil, IEEE, Dec. 6, 2005, pp. 361-366, total 6 pages.

* cited by examiner

Obtain a plurality of prediction confidence levels and prediction results according to the first test data and the second test data — 221

Obtain a plurality of detection thresholds according to the plurality of prediction confidence levels and the prediction results — 222

FIG. 3

Real target frame

Prediction target frame 1

Prediction target frame 2

```
┌─────────────────────────────────────────────┐
│ Determine a primary population of a genetic │
│ algorithm model based on a plurality of     │── 2221
│ prediction confidence levels and prediction │
│ results                                     │
└─────────────────────────────────────────────┘
                      │
                      ▼
┌─────────────────────────────────────────────┐
│ Obtain a non-inferior solution of objective │
│ functions of an overkill rate and a missed  │
│ detection rate by performing iteration      │── 2222
│ according to the primary population based   │
│ on the objective functions of the overkill  │
│ rate and the missed detection rate          │
└─────────────────────────────────────────────┘
                      │
                      ▼
┌─────────────────────────────────────────────┐
│ Determine a plurality of detection          │── 2223
│ thresholds based on the non-inferior        │
│ solution                                    │
└─────────────────────────────────────────────┘
```

FIG. 5

```
┌──────────────────────────────────────────────┐
│ Obtain first test data and second test data  │── 610
└──────────────────────────────────────────────┘
                      │
                      ▼
┌──────────────────────────────────────────────┐
│ Obtain a plurality of prediction confidence  │── 620
│ levels and prediction results based on the   │
│ first test data and the second test data     │
└──────────────────────────────────────────────┘
                      │
                      ▼
┌──────────────────────────────────────────────┐
│ Determine a primary population of a genetic  │── 630
│ algorithm model based on the plurality of    │
│ prediction confidence levels and the         │
│ prediction results                           │
└──────────────────────────────────────────────┘
                      │
                      ▼
┌──────────────────────────────────────────────┐
│ Obtain a non-inferior solution of objective  │
│ functions of an overkill rate and a missed   │
│ detection rate by performing iteration       │── 640
│ according to the primary population based    │
│ on the objective functions of the overkill   │
│ rate and the missed detection rate           │
└──────────────────────────────────────────────┘
                      │
                      ▼
┌──────────────────────────────────────────────┐
│ Determine a plurality of detection           │── 650
│ thresholds based on the non-inferior         │
│ solution                                     │
└──────────────────────────────────────────────┘
```

DETECTION METHOD, DETECTION DEVICE AND STORAGE MEDIUM

CROSS-REFERENCE TO RELATED APPLICATION

The present application is a continuation of International Application No. PCT/CN2022/117361, filed Sep. 6, 2022, which is incorporated herein by reference in its entirety.

TECHNICAL FIELD

The present application relates to the field of detection technologies, and in particular, to a detection method, a detection device, and a storage medium.

BACKGROUND

In existing detection technology field, a detection result is generally determined by comparing a preset threshold with a detected detection value, and the preset threshold is often based on subjective settings or empirical values of the developer, which affects the accuracy of the detection result.

Therefore, how to provide a detection method so as to improve the accuracy of a detection result is an urgent technical problem to be solved.

SUMMARY OF THE DISCLOSURE

The present application provides a detection method, a detection device, and a storage medium to improve the accuracy of a detection result.

In a first aspect, the present application provides a detection method, comprising: obtaining a to-be-detected image; obtaining a plurality of confidence levels corresponding to a plurality of detection items according to the to-be-detected image; and determining a detection result of the to-be-detected image according to the plurality of confidence levels and a plurality of detection thresholds, where the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified.

An embodiment of the present application provides a detection method, comprising: obtaining a to-be-detected image; obtaining a plurality of confidence levels corresponding to a plurality of detection items according to the to-be-detected image; and determining a detection result of the to-be-detected image according to the plurality of confidence levels and a plurality of detection thresholds, where the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified. The detection method is used for detecting a to-be-detected image according to a plurality of detection thresholds corresponding to a plurality of detection items, and the plurality of detection thresholds are a non-inferior solution of objective functions of an overkill rate and a missed detection rate. In this way, the specific values of the plurality of detection thresholds are more appropriate. When a plurality of detection items of a to-be-detected image are detected by using a plurality of detection thresholds, it is beneficial to avoid the phenomenon that the defective ones are detected as qualified and the qualified ones are detected as defective, so as to improve the accuracy of a detection result.

In a possible implementation, before the determining a detection result of the to-be-detected image according to the plurality of confidence levels and a plurality of detection thresholds, the detection method further comprises: obtaining first test data and second test data, wherein the first test data is qualified data, and the second test data is unqualified data; and obtaining the plurality of detection thresholds according to the first test data and the second test data. In this way, after the plurality of detection thresholds are obtained, it is conducive to detecting the to-be-detected image based on the plurality of detection thresholds.

In a possible implementation, the obtaining the plurality of detection thresholds according to the first test data and the second test data comprises: obtaining a plurality of prediction confidence levels and prediction results according to the first test data and the second test data, wherein the plurality of prediction confidence levels are corresponding to the plurality of detection items; and obtaining the plurality of detection thresholds according to the plurality of prediction confidence levels and the prediction results. In this way, it is conducive to obtaining a plurality of detection thresholds according to a plurality of prediction confidence levels and prediction results.

In a possible implementation, the obtaining the plurality of detection thresholds according to the plurality of prediction confidence levels and the prediction results comprises: determining a primary population of a genetic algorithm model according to the plurality of prediction confidence levels and the prediction result; obtaining a non-inferior solution of the objective functions of the overkill rate and the missed detection rate by performing iteration according to the primary population based on the objective functions of the overkill rate and the missed detection rate; and determining the plurality of detection thresholds according to the non-inferior solution. In this way, it is conducive to determining related parameters of the genetic algorithm model, so as to calculate a plurality of detection thresholds according to the genetic algorithm model.

In a possible implementation, independent variables of the objective functions of the overkill rate and the missed detection rate are corresponding to the plurality of detection items, and dependent variables of the objective functions of the overkill rate and the missed detection rate are the overkill rate and the missed detection rate. In this way, the independent variables of the objective function may be determined according to a plurality of detection items and a plurality of prediction confidence levels corresponding to the plurality of detection items, and the dependent variables of the objective function may be determined according to the prediction result and the first test data and the second test data. In this way, the objective function of the genetic algorithm model may be determined, so that a plurality of detection thresholds may be calculated based on the objective function.

In a possible implementation, the determining the plurality of detection thresholds according to the non-inferior solution comprises: determining a set of detection thresholds according to the non-inferior solution, wherein the set of detection thresholds includes multiple groups of the non-inferior solutions; and determining the plurality of detection thresholds according to the non-inferior solution corresponding to a minimum missed detection rate in the set of detection thresholds. In the process of performing iterative solving through the genetic algorithm model based on an objective function, there may be a plurality of non-inferior solutions. Among the plurality of non-inferior solutions, the non-inferior solution corresponding to a minimum missed detection rate is selected as the plurality of detection thresholds, so that the missed detection rate can be further reduced on the premise of ensuring the overkill rate.

In a possible implementation, the non-inferior solution is a solution when the objective functions of the overkill rate and the missed detection rate are in the Pareto optimal state. In this way, when both the objective function of the overkill rate and the objective function of the missed detection rate are in the Pareto optimal state, a set of detection thresholds that meets the requirements may be determined, and then the required detection thresholds may be selected according to the set of detection thresholds.

In a possible implementation, the obtaining a non-inferior solution of the objective functions of the overkill rate and the missed detection rate by performing iteration according to the primary population based on the objective functions of the overkill rate and the missed detection rate comprises: obtaining a non-inferior solution of the objective functions of the overkill rate and the missed detection rate by performing iteration on the primary population through an elitist non-dominated sorting genetic algorithm. In this way, the solving speed of a plurality of detection thresholds can be accelerated, so that the solving process is more efficient; at the same time, individuals with better characteristics may be retained in the population during iteration, so that the calculated solution is more accurate.

In a possible implementation, the first test data is overkill data, and the overkill data is the data in which qualified ones are detected as defective in the first test data. In this way, it is conducive to determining an objective function of the overkill rate according to the overkill data, so that in the subsequent process of obtaining a plurality of detection thresholds, it is conducive to determining a plurality of detection thresholds according to the objective function of the overkill rate.

In a possible implementation, the quantity of the first test data is the same as the quantity of the second test data. In this way, it is conducive to determining objective functions of the overkill rate and the missed detection rate according to the first test data and the second test data with the same quantity, so as to improve the accuracy of the detection result.

In a possible implementation, the determining a detection result of the to-be-detected image according to the plurality of confidence levels and a plurality of detection thresholds comprises: determining the detection result as unqualified in a case where the plurality of confidence levels are greater than at least one of the detection thresholds; or determining the detection result as qualified in a case where the plurality of confidence levels are less than or equal to each of the detection thresholds.

In this implementation, in a case where the plurality of confidence levels are greater than any one of the plurality of detection thresholds, it can be determined that the detection result is unqualified; and in a case where the plurality of confidence levels are less than or equal to each of the corresponding detection values, it can be determined that the detection result is qualified. In this way, it is conducive to determining whether a defect exists in a to-be-detected image.

In a second aspect, the present application provides a detection device, comprising a processing module, the processing module is configured to: obtain a to-be-detected image; obtain a plurality of confidence levels corresponding to a plurality of detection items according to the to-be-detected image; and determine a detection result of the to-be-detected image according to the plurality of confidence levels and a plurality of detection thresholds, wherein the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified.

In a third aspect, an embodiment of the present application provides a detection device, comprising: a memory, configured to store computer executable instructions; and a processor, configured to access the memory and execute the computer executable instructions so as to perform operations in the method according to any one of the first aspect.

In a fourth aspect, the present application provides a storage medium, configured to store a computer program. When the computer program is executed by a computing device, the computing device is caused to implement the method according to any one of the first aspect.

An embodiment of the present application provides a detection method, comprising: obtaining a to-be-detected image; obtaining a plurality of confidence levels corresponding to a plurality of detection items according to the to-be-detected image; and determining a detection result of the to-be-detected image according to the plurality of confidence levels and a plurality of detection thresholds, wherein the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified. The detection method is used for detecting a to-be-detected image according to a plurality of detection thresholds corresponding to a plurality of detection items, and the plurality of detection thresholds are a non-inferior solution of objective functions of the overkill rate and the missed detection rate. In this way, the specific values of the plurality of detection thresholds are more appropriate. When a plurality of detection items of a to-be-detected image are detected by using a plurality of detection thresholds, it is beneficial to avoid the phenomenon that the defective ones are detected as qualified and the qualified ones are detected as defective, so as to improve the accuracy of a detection result.

DESCRIPTION OF DRAWINGS

In order to illustrate the technical solutions of the embodiments of the present application more clearly, the drawings required in the examples of the present application will be briefly introduced below. Obviously, the drawings described below are only some examples of the present application. For those of ordinary skill in the art, other drawings can also be obtained according to the drawings without any creative effort.

In the drawings, the drawings are not drawn to actual scale.

DETAILED DESCRIPTION

The implementations of the present application will be further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the field of target detection, a predetermined threshold is usually set, and whether a corresponding target exists is determined by comparing the predetermined threshold with a detection value or a confidence level obtained by a detection model. For example, in the field of industrial defect detection, a predetermined threshold may be used to determine whether a product has a corresponding defect.

The researchers found that the predetermined threshold is usually set based on the subjective or empirical value of the developer. The predetermined threshold is critical to the accuracy of a detection result, and in a case where it is considered the product is defective upon a confidence level is greater than a predetermined threshold, if the predetermined threshold is set too small, some qualified products will be determined as defective, resulting in overkill; and if the predetermined threshold is set too large, some defective products will be determined as qualified, resulting in missed detection.

In order to determine a suitable predetermined threshold, in some schemes, an optimal solution of the predetermined threshold is sought by means of grid search. However, the researchers found that only a group of approximate optimal solutions can be obtained by means of grid search, and it is difficult to obtain an exact optimal solution of the threshold. Furthermore, when there are a plurality of detection items, the grid search method is not only time-consuming but also difficult to search, so it is difficult to obtain suitable thresholds.

In view of this, the present application provides a detection method, wherein the detection thresholds are corresponding to a plurality of detection items and which are a non-inferior solution of objective functions of the overkill rate and the missed detection rate. In this way, the specific values of the detection thresholds are more appropriate, and when a plurality of detection items of a to-be-detected image are detected by using a plurality of detection thresholds, it is beneficial to avoid the phenomenon that the defective ones are detected as qualified and the qualified ones are detected as defective, so as to improve the accuracy of a detection result.

The detection method in the present application may be applied to the field of target detection. In the field of target detection, the to-be-detected image is usually processed to obtain a confidence level corresponding to a target, and it can be determined whether a corresponding target exists in the to-be-detected image by comparing a preset detection threshold and the confidence level. For example, the detection method in the present application may be applied to the field of multi-defect detection in industry, for example, to the field of multi-defect detection of tabs. For a to-be-detected image, a plurality of detection items need to be detected, and a detection result of each detection item will affect the detection result of the to-be-detected image. For example, as long as one detection item has an abnormality, it can be determined that the detection result of the to-be-detected image is unqualified; only when a plurality of detection items are all normal, it can be determined that the to-be-detected image is qualified. Therefore, the setting of a plurality of detection thresholds corresponding to the plurality of detection items is critical to the accuracy of a detection result.

Figure 1:
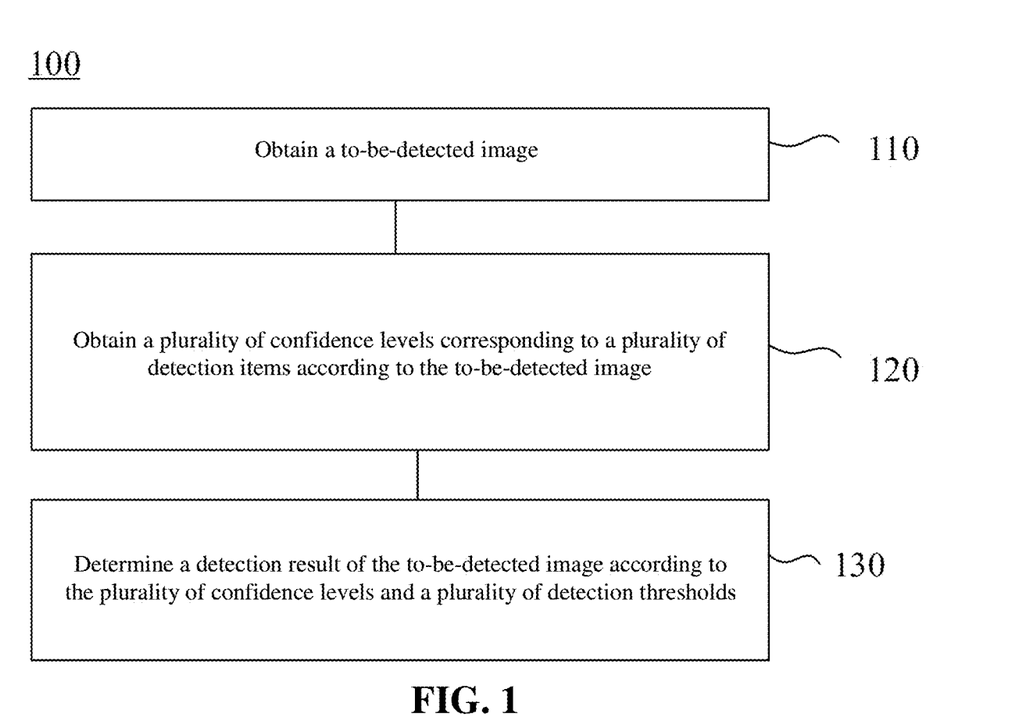
FIG. 1 is a schematic diagram of a detection method according to an embodiment of the present application.

FIG. 1 is a schematic diagram of a detection method according to an embodiment of the present application. As shown in FIG. 1, the detection method 100 comprises the following steps.

Step 110: Obtain a to-be-detected image.

The to-be-detected image is a photo of an object, and a state of the object can be determined by detecting the to-be-detected image. For example, when defect detection is performed by using a to-be-detected image, the to-be-detected image may be a photo of a product, by detecting the to-be-detected image, whether a defect exists in the product can be determined.

Step 120: Obtain a plurality of confidence levels corresponding to a plurality of detection items according to the to-be-detected image.

When a target detection is performed, usually there are a plurality of detection items. For example, a tab of an electrode sheet usually has a plurality types of defects, such as foreign matters, tears, notches, fold, wrinkle, and z-shape fold, and in order to detect a plurality types of defects, a plurality of detection items are usually set corresponding to the plurality types of defects.

Each detection item corresponds to a confidence level. For example, in the field of defect detection, the confidence level represents a possibility that the detection result of a detection item has such defect, the value of the confidence level is in a range of 0-1, and a higher value of the confidence level represents a higher possibility that such defect exists.

In step 120, the to-be-detected image may be input into a detection device, and then the detection device calculates a plurality of confidence levels corresponding to the plurality of detection items. For example, step 120 may be specifically performed by a detection model in the detection device. The detection model may calculate, based on the input to-be-detected image, confidence levels in one-to-one correspondence with the plurality of detection items. The detection model may be a pre-trained model.

Step 130: Determine a detection result of the to-be-detected image according to the plurality of confidence levels and a plurality of detection thresholds.

The plurality of detection thresholds are corresponding to the plurality of detection items, that is, the plurality of detection thresholds are in a one-to-one correspondence with the plurality of detection items. By comparing the detection threshold and the confidence level corresponding to each detection item, a detection result of the detection item can be determined.

The plurality of detection thresholds are a non-inferior solution of objective functions of the overkill rate and the missed detection rate, the overkill rate is the ratio of qualified ones detected as defective, and the missed detection rate is the ratio of defective ones detected as qualified.

The non-inferior solution means that no solution that can further improve the objective of the objective function can be found in an alternative solution set. The plurality of detection thresholds being non-inferior solution of objective functions of the overkill rate and the missed detection rate, that is to say, the plurality of detection thresholds are optimal harmonic solution for balancing the overkill rate and the missed detection rate.

The defect is a defect to a certain degree. For example, with regard to the detection item of fold, a slight small fold will be determined as no fold defect, and when the fold exceeds a predetermined degree, it is considered that there is a fold defect. The predetermined degree may be a folding degree that is set manually in advance.

The qualified means that there is no defect. That is to say, for a plurality of detection items, if none of the detection results of the plurality of detection items has a defect, the detection result of the to-be-detected image is qualified.

It should be noted that the defect in the embodiment of the present application means that in the detection process, an object or a product corresponding to an image is not in a good condition, and does not necessarily means that the object or the product cannot be used due to the defect.

The method in the embodiment of the present application may be performed by a detection device, and particularly may be performed by a processing module in a detection device. The processing module may be built in a computer, and the computer may obtain related data in a production line, wherein the computer may be connected with the production line or not connected with the production line.

An embodiment of the present application provides a detection method, comprising: obtaining a to-be-detected image; obtaining a plurality of confidence levels corresponding to a plurality of detection items according to the to-be-detected image; and determining a detection result of the to-be-detected image according to the plurality of confidence levels and a plurality of detection thresholds, where the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified. The detection method is used for detecting a to-be-detected image according to a plurality of detection thresholds corresponding to a plurality of detection items, and the plurality of detection thresholds are a non-inferior solution of objective functions of an overkill rate and a missed detection rate. In this way, the specific values of the plurality of detection thresholds are more appropriate. When a plurality of detection items of a to-be-detected image are detected by using a plurality of detection thresholds, it is beneficial to avoid the phenomenon that the defective ones are detected as qualified and the qualified ones are detected as defective, so as to improve the accuracy of a detection result.

Figure 2:
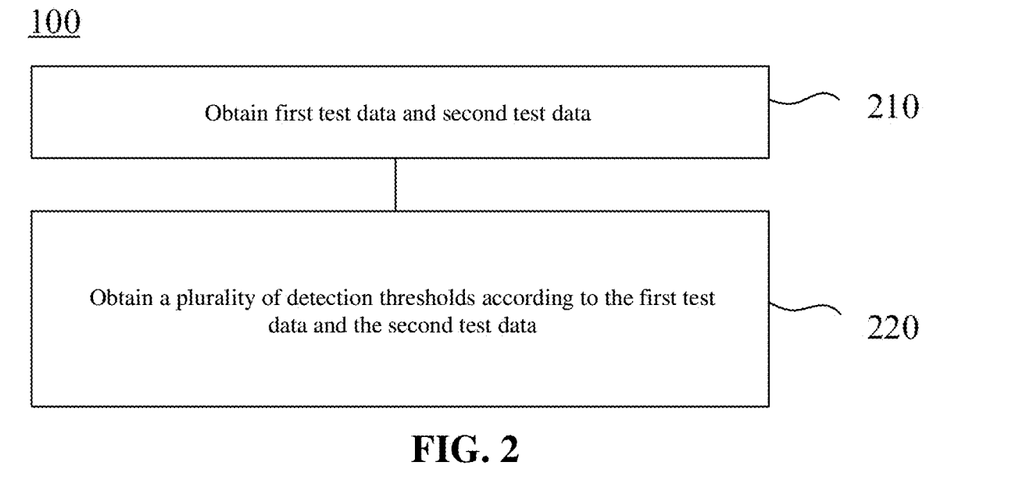
FIG. 2 is a schematic diagram of a detection method according to an embodiment of the present application.

FIG. 2 is a schematic diagram of a detection method according to an embodiment of the present application. In an embodiment, before step 130, the detection method 100 further includes the following steps.

Step 210: Obtain first test data and second test data. The first test data is qualified data, and the second test data is unqualified data The first test data and the second test data are real data, that is, actual values that exist objectively. The real value may be theoretical real value, prescribed real value or relative real value.

The first test data is qualified data, that is, the qualified data in practice. The first test data may be image data, and an object corresponding to the image does not have a defect corresponding to the plurality of detection items. For example, the data is an image of a tab, and the plurality of detection items are six types of defects detection item such as foreign matters, tears, notches, fold, wrinkle, and z-shaped fold of a tab, and the tap in the image does not have any of the six types of defects.

The second test data is unqualified data, that is, the unqualified data in practice. The second test data may be image data, and an object corresponding to the image has defects corresponding to the plurality of detection items. For example, the data is an image of a tab, and the plurality of detection items are six types of defect detection items such as foreign matters, tears, notches, fold, wrinkle, and z-shaped fold of a tab, and the tap in the image has at least one defect corresponding to the detection items.

Step 220: Obtain a plurality of detection thresholds according to the first test data and the second test data.

In this embodiment, the plurality of detection thresholds are obtained based on the first test data and the second test data, and specific values of the plurality of detection thresholds are more appropriate. After the plurality of detection thresholds are obtained, the plurality of detection thresholds may be used as detection thresholds of the detection device, so that it is conducive to determining whether the to-be-detected image meets the requirements according to the confidence levels of the to-be-detected image obtained by the detection device and the detection thresholds.

Figure 3:
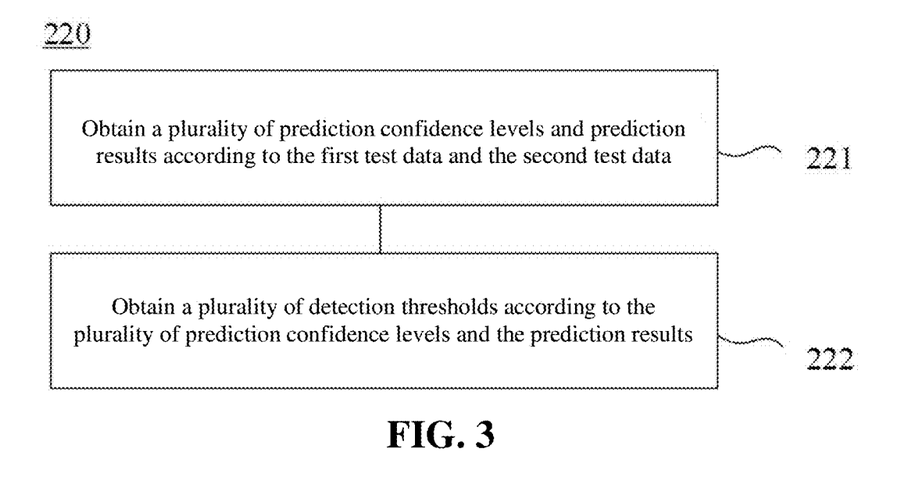
FIG. 3 is a schematic diagram of obtaining detection thresholds according to an embodiment of the present application.

FIG. 3 is a schematic diagram of obtaining detection thresholds according to an embodiment of the present application. In an embodiment, as shown in FIG. 3, step 220 includes the following steps.

Step 221: Obtain a plurality of prediction confidence levels and prediction results according to the first test data and the second test data. The plurality of prediction confidence levels are corresponding to the plurality of detection items.

Step 222: Obtain a plurality of detection thresholds according to the plurality of prediction confidence levels and the prediction results.

In step 221, the first test data and the second test data may be input into the detection device, and then the detection device calculates a plurality of prediction confidence levels and prediction results. For example, the first test data and the second test data are input into a prediction model in the detection device, and the prediction model calculates to obtain prediction confidence levels and prediction results that are in one-to-one correspondence with the plurality of detection items.

The prediction model may be a pre-trained model, and the prediction model may have the same structure as the detection model, or may have different structure from the detection model.

In some embodiments, step 221 and step 222 may comprise the following specific steps.

Firstly, a detection device obtains input data. The input data may be the first test data, or may be the second test data.

Secondly, the detection device analyzes the input data, and generates a plurality of detection frames.

In this step, analyzing the input data comprises: analyzing the input image, detecting whether the input image has a defect corresponding to each of the detection items respectively. For example, in the process of detecting whether an input image has the defect of tab folding, the detection device generates a plurality of prediction target frames, and selects a prediction target frame with the largest intersection over union (IOU) as the final target frame by calculating the IOU between the each prediction target frame and the real target frame. The final target frame has a different confidence value corresponding to each detection item, and in the case of detecting four types of defects, the final target frame has four confidence values, the sum of the four confidence values is 1, a maximum confidence value is selected as the prediction confidence level, and then the prediction confidence level is output. When four detection items are detected, four prediction confidence levels may be obtained finally for each input image.

Figure 4:
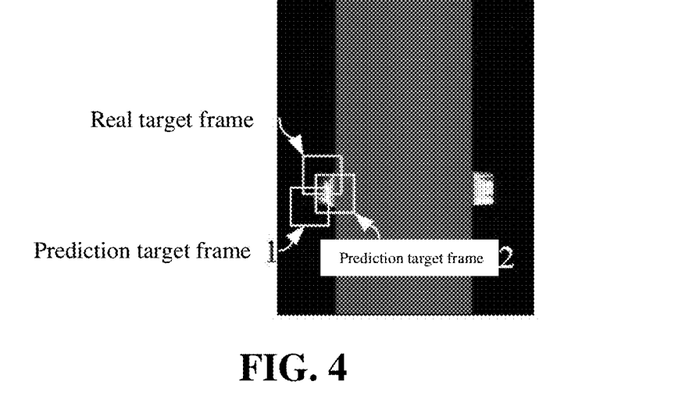
FIG. 4 is a schematic diagram of defect detection according to an embodiment of the present application.

FIG. 4 is a schematic diagram of defect detection according to an embodiment of the present application. A schematic diagram of performing defect detection on a tab is shown in FIG. 4, wherein a real target frame, a prediction target frame 1 and a prediction target frame 2 are included in this figure. In a process of detecting one of the detection items on a tab, a plurality of prediction target frames are generated (only two are shown in FIG. 4, but there may be more in practice). By calculating the intersection over union between each prediction target frame and the real target frame, a prediction target frame closest to the real target frame may be determined. For example, in FIG. 4, the intersection over union between the prediction target frame 2 and the real target frame is the largest, and therefore, the prediction target frame 2 may serve as the final target frame, that is, the target frame closest to the real target frame.

In an actual production process, a detection device may be used to determine a defect type of an object corresponding to an input image. For example, in a detection task with four detection items, the prediction target frame 2 has four confidence values, the sum of the four confidence values is 1, and the detection item corresponding to the maximum confidence value highly likely to be the defect type of the target. When the maximum confidence level is greater than a predetermined threshold, it may be determined that the target has a defect of this type.

Finally, the detection device compares each predetermined threshold with a corresponding prediction confidence level, and outputs a prediction result. Table 1 is specific data of prediction confidence levels and prediction results that are output by a prediction model according to an embodiment of the present application. Table 1 merely describes prediction results and prediction confidence levels as an example, and does not specifically limit the embodiments of the present application.

TABLE 1

Prediction confidence levels and prediction results

| ID | Score 1 | Score 2 | Score 3 | Score 4 | Prediction result |
|----|---------|---------|---------|---------|-------------------|
| 0  | 0.0630  | 0       | 0       | 0.765   | NG |
| 1  | 0.76    | 0.09    | 0.12    | 0.05    | NG |
| 2  | 0.05    | 0       | 0       | 0.1     | OK |
| 3  | 0       | 0       | 0.06    | 0       | OK |

In Table 1, the IDs represent serial numbers of input images, different numbers represent different samples, Score 1, Score 2, Score 3 and Score 4 respectively represent prediction confidence levels of different detection items. For example, the predetermined thresholds of four types of detection items are 0.05, 0.1, 0.1, and 0.5, respectively. In the image with ID 0, the prediction confidence levels of four types of detection items are 0.0630, 0, 0, 0.765 respectively, the value of Score 1 is greater than 0.05, and the value of Score 4 is greater than 0.5; therefore, the image of number 0 is determined as unqualified, and the prediction result is NG. The prediction result is NG means there is a defect in the object corresponding to the image, which does not necessarily mean that the object corresponding to the image cannot be used and needs to be scrapped. In the image with ID 3, the prediction thresholds of the four types of detection items are 0, 0, 0.06, and 0 respectively, and the four values are all less than the predetermined thresholds corresponding to the four detection items; therefore, the image of number 3 is determined to be qualified, and the prediction result is OK.

In this embodiment, the file output by the detection device includes predicted values of a plurality of input samples, and the predicted values include a plurality of prediction confidence levels corresponding to the plurality of detection items and prediction results.

In this embodiment, both the obtained prediction confidence levels and the prediction results are predicted values, and both the first test data and the second test data are real values. The prediction confidence levels and the prediction results may be obtained by using the first test data and the second test data, so that in a subsequent process, it is conducive to calculating a plurality of detection thresholds based on the prediction confidence levels and the prediction results.

Figure 5:
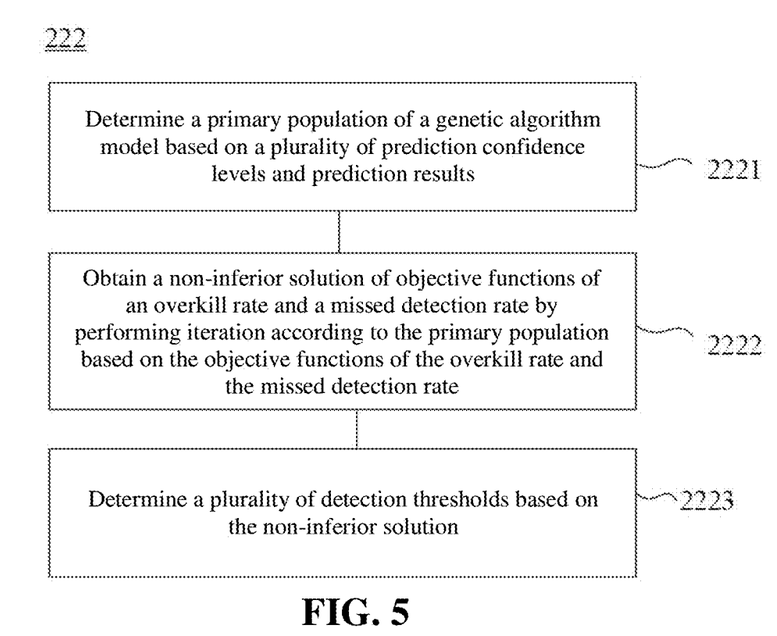
FIG. 5 is a schematic diagram of obtaining detection thresholds according to an embodiment of the present application.

FIG. 5 is a schematic diagram of obtaining detection thresholds according to an embodiment of the present application. In an embodiment, as shown in FIG. 5, step 222 includes the following steps.

Step 2221: Determine a primary population of a genetic algorithm model based on a plurality of prediction confidence levels and prediction results.

The genetic algorithm model refers to the method of simulating the natural evolution process of organisms, a primary population is generated by coding, and then through genetic or cross mutation, gradually evolves to get better approximate solutions according to the principle of survival of the fittest, until an optimal solution is generated by iteration.

The file output by the detection device, that is, the serial numbers of samples, the plurality of prediction confidence levels corresponding to the samples and the prediction results in the file, are used as inputs of the genetic algorithm model, and then a primary population is determined according to the inputs of the genetic algorithm. For example, the number of primary populations may be set to 500.

Step 2222: Obtain a non-inferior solution of objective functions of an overkill rate and a missed detection rate by performing iteration according to the primary population based on the objective functions of the overkill rate and the missed detection rate.

Through selection, crossover and mutation, a progeny population is obtained through the primary population, and then a new progeny population is obtained through selection, crossover and mutation of the progeny population. Thus, the iteration is continued until a convergence condition is reached, for example, when the number of iterations reaches 100, the iteration is stopped.

The iterative process is performed based on objective functions of the overkill rate and the missed detection rate, and the purpose is to seek a non-inferior solution of the objective functions of the overkill rate and the missed detection rate.

Step 2223: Determine a plurality of detection thresholds based on the non-inferior solution.

Since multiple groups of non-inferior solutions may be obtained in the process of solving the genetic algorithm model, suitable detection thresholds need to be determined from the multiple groups of non-inferior solutions.

In this embodiment, the file output by the detection device described above may be used as an input file of the genetic algorithm model, so that it is conducive to calculating a plurality of detection thresholds based on the genetic algorithm model.

In an embodiment, the independent variables of the objective functions of the overkill rate and the missed detection rate are corresponding to a plurality of detection items, and the dependent variables of the objective functions of the overkill rate and the missed detection rate are the overkill rate and the missed detection rate.

The independent variables of the objective function of the overkill rate and the objective function of the missed detection rate being corresponding to a plurality of detection items, that is, a plurality of prediction confidence levels may be used as the independent variable of the objective function of the overkill rate and the objective function of the missed detection rate. For example, the objective function of the overkill rate and the objective function of the missed detection rate are corresponding to four detection items, and then independent variables of the two objective functions are x1, x2, x3, and x4.

Missed detection may mean that the prediction result of the second test data (unqualified data) in the prediction model of the detection device is qualified. That is to say, the missed detection means that the real value is unqualified, but is detected or predicted as qualified.

In the objective function of the missed detection rate, the missed detection rate is a ratio of the number of missed detected images to the number of images that the real value is unqualified.

Overkill may mean that the prediction result of the first test data (qualified data) in the prediction model of the detection device is unqualified. That is, the real value is qualified, but is detected or predicted as unqualified.

In the objective function of the overkill rate, the overkill rate is a ratio of the number of overkilled images to the number of images that the real value is qualified.

In this embodiment, the independent variables are prediction confidence levels corresponding to a plurality of detection items, and the dependent variables are the overkill rate and the missed detection rate, so as to obtain prediction confidence levels that enable the overkill rate and the missed detection rate to be optimal in a given range, thereby facilitating determining a plurality of detection thresholds.

In an embodiment, step 2223 comprises: determining a set of detection thresholds according to the non-inferior solution, the set of detection thresholds comprises multiple groups of non-inferior solutions; determining a plurality of detection thresholds according to a non-inferior solution corresponding to the minimum missed detection rate in the set of detection thresholds.

In this embodiment, in a process of performing iterative solving by using a genetic algorithm model based on an objective function, there may be a plurality of non-inferior solutions. Among the plurality of non-inferior solutions, the non-inferior solution corresponding to the minimum missed detection rate is selected as the plurality of detection thresholds, so that the missed detection rate can be further reduced on the premise of ensuring the overkill rate, so as to avoid misjudging unqualified products as qualified products, and conducive to the improvement of production efficiency and safety.

In an embodiment, the non-inferior solution is a solution when the objective function of the overkill rate and the objective function of the missed detection rate are in the Pareto optimal state.

In the genetic algorithm model, the problem of solving a plurality of detection thresholds can be regarded as the problem of optimizing the two objective functions of the overkill rate and the missed detection rate. For the optimization problem of multiple objective functions, a solution space thereof is discrete, and the solutions of the optimization problem of multiple objective functions are usually a group of equilibrium solutions, that is, an optimal solution set composed of a group of multiple Pareto optimal solutions.

A solution in the Pareto optimal state may be referred to as Pareto optimal solution or non-dominated solution, that is to say, it is impossible to find a group of detection threshold solutions that can simultaneously make the overkill rate and the missed detection rate smaller than the current solution.

In this embodiment, in a case where the objective functions of the overkill rate and the missed detection rate are in the Pareto optimal state, that is, in a case where both the overkill rate and the missed detection rate are in the Pareto optimal state, the values of the independent variables are the Pareto optimal solutions. For example, in a case where four detection items are included, independent variables corresponding to each detection item are x1, x2, x3, and x4 respectively, and a Pareto optimal solution is p={x1, x2, x3, x4}. In the genetic algorithm model, there are usually a plurality of solutions to the optimization problem of multiple objective functions. In other words, there may be a plurality of Pareto optimal solutions p, and the plurality of Pareto optimal solutions p constitute a set of detection thresholds.

In this embodiment, when the objective function of the overkill rate and the objective function of the missed detection rate are in the Pareto optimal state, a set of detection thresholds that meets the requirements may be determined, and the required detection thresholds may be selected according to the set of detection thresholds.

Compared with obtaining an approximate optimal solution of thresholds by using the grid search method, obtaining a plurality of detection thresholds by using the genetic algorithm model in the present application not only takes less time but also easier to solve, and an optimal solution of thresholds for balancing the overkill rate and the missed detection rate can be found in this way, which is beneficial to achieving more accurate detection result.

In an embodiment, step 2222 comprises: obtaining a non-inferior solution of the objective functions of the overkill rate and the missed detection rate by performing iteration on the primary population through an elitist non-dominated sorting genetic algorithm (NSGA-II). In this way, the solving speed of the plurality of detection thresholds can be accelerated, so that the solution process is more efficient. At the same time, during the iteration, individuals with better characteristics may be retained in the population, so that the calculated solutions are more accurate.

The advantages of NSGA-II lies in the introduction of non-dominated sorting, the concept of congestion degree and congestion degree comparison operators, and the introduction of elite strategies and so on. The non-dominated sorting uses the concept of the Pareto optimal solution to rank individuals in a population, individuals with higher non-dominated state are ranked in higher levels, so that better individuals can be selected and have a greater chance to enter the next iteration. The congestion degree is only applicable to the comparison between individuals in a same dominant level, a congestion degree of each individual is obtained by calculating the congestion degree for each objective function of each individual, and the excellence degree of the individuals are compared through their congestion degree. The elitist strategy is to combine the current population and the sub-population generated by selection, crossover and mutation, both of them compete together to generate the next population, so as to ensure that individuals with better characteristics can remain in the population, thereby improving the diversity of the population and computational efficiency.

In an embodiment, the first test data is overkill data, and the overkill data is the data in which qualified ones are detected as defective in the first test data.

Optionally, the first test data includes overkill data. In this way, it can be avoided that the first data does not include overkill data, resulting in the value of the overkill rate is 0, which is not conducive to the subsequent calculation of multiple detection thresholds based on the overkill rate and the missed detection rate through the genetic algorithm.

In this embodiment, it is conducive to determining the overkill rate based on the overkill data, so that in a subsequent process of obtaining multiple detection thresholds, it is conducive to determining a plurality of detection thresholds according to the objective function of the overkill rate.

In an embodiment, the quantity of the first test data is the same as the quantity of the second test data. In this way, it is conducive to determining the objective function of the overkill rate and the objective function of the missed detection rate based on the first test data and the second test data that have the same quantity, so as to improve calculation accuracy of the missed detection rate and the overkill rate, thereby improving the accuracy of the detection result.

In an embodiment, step 130 includes: determining that the detection result is unqualified in a case where the plurality of confidence levels are greater than at least one of the detection thresholds; or determining that the detection result is qualified in a case where the plurality of confidence levels are less than or equal to each of the detection thresholds.

In this embodiment, the plurality of confidence levels are corresponding to the plurality of detection items, that is, the plurality of confidence levels are in one-to-one correspondence with the plurality of detection items, and the plurality of detection items are further in one-to-one correspondence with the plurality of detection thresholds. Therefore, the plurality of confidence levels are in one-to-one correspondence with the plurality of detection thresholds.

In the process of performing defect detection, the detection device may calculate a confidence level corresponding to each detection item of the to-be-detected image. By comparing the plurality of confidence levels with the plurality of detection thresholds in one-to-one relationship, in a case where a confidence level is greater than a detection threshold, it can be determined that a defect corresponding to the detection item exists in the to-be-detected image. In a case where all the confidence levels are less than or equal to the corresponding detection thresholds, it may be determined that there is no defect corresponding to the detection items in the to-be-detected image.

In this implementation, when the confidence levels are greater than any one of corresponding detection thresholds, it may be determined that the detection result is unqualified; when the confidence levels are less than or equal to each of corresponding detection values, it may be determined that the detection result is qualified. In this way, it is conducive to determining whether an object corresponding to the to-be-detected image has a defect.

Figure 6:
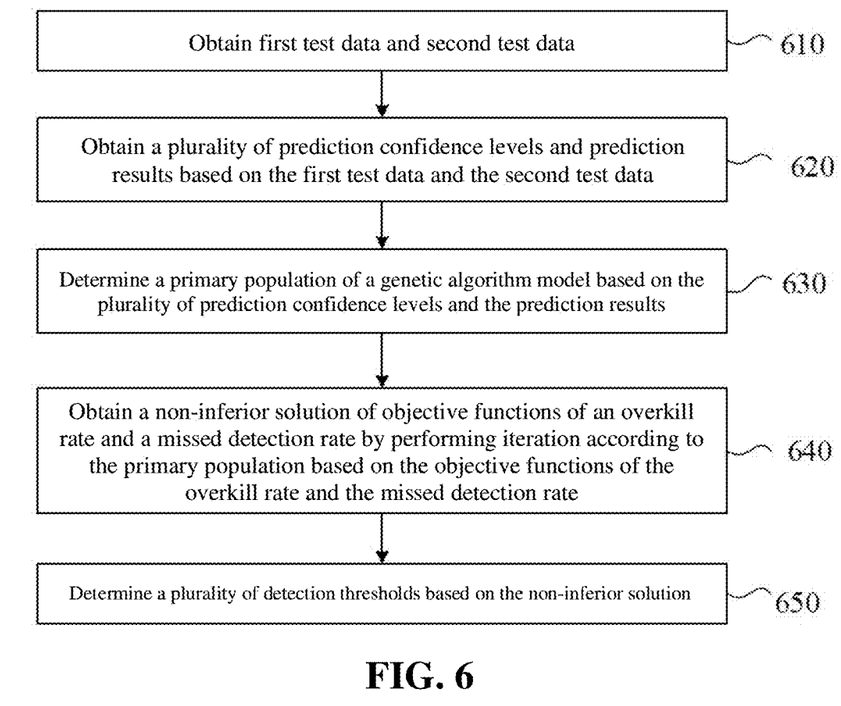
FIG. 6 is a flowchart of obtaining a plurality of detection thresholds according to an embodiment of the present application.

FIG. 6 is a flowchart of obtaining a plurality of detection thresholds according to an embodiment of the present application. As shown in FIG. 6, obtaining a plurality of detection thresholds may include the following steps.

Step 610: Obtain first test data and second test data.

Step 620: Obtain a plurality of prediction confidence levels and prediction results based on the first test data and the second test data.

After the first test data and the second test are input into the detection device and processed by the detection device, prediction confidence levels, prediction results, and serial numbers of the corresponding test data are output, and these outputs may be stored in an output file so as to be used in a subsequent calculation process.

For example, there are n groups of test data, each group of the test data corresponds to one image, each image has m detection items to be detected, therefor, in the output file, the number of prediction confidence levels is n*m, and the number of prediction results is n.

Step 630: Determine a primary population of a genetic algorithm model based on the plurality of prediction confidence levels and the prediction results.

The output file obtained in step 620 is used as the input file of the genetic algorithm model. The input file may be used as a primary population of the genetic algorithm model, or may be coded based on the input file to obtain the primary population.

Step 640: Obtain a non-inferior solution of objective functions of an overkill rate and a missed detection rate by performing iteration according to the primary population based on the objective functions of the overkill rate and the missed detection rate.

In the genetic algorithm model, m prediction confidence levels corresponding to m detection items are used as independent variables of the objective functions of the overkill rate and the missed detection rate, and the overkill rate and the missed detection rate are used as dependent variables of the objective functions of the overkill rate and the missed detection rate. A plurality of detection thresholds are determined by seeking a non-inferior solution of the objective functions of the overkill rate and the missed detection rate.

Step 650: Determine a plurality of detection thresholds based on the non-inferior solution.

The final calculation result of the genetic algorithm model may have a plurality of non-inferior solutions, and the plurality of non-inferior solutions form a set of detection thresholds. A suitable solution may be selected from the set of detection thresholds as the detection thresholds. For example, in the set of detection thresholds, a non-inferior solution corresponding to the minimum missed detection rate is selected, and then m detection thresholds corresponding to the m detection items may be determined according to the selected non-inferior solution.

The method embodiments of the present application are described in detail above with reference to FIG. 1 to FIG. 6. The embodiments of the detection device of the present application will be described in detail below. It should be understood that the method embodiments are corresponding to the embodiments of the device, similar descriptions may refer to method embodiments.

Figure 7:
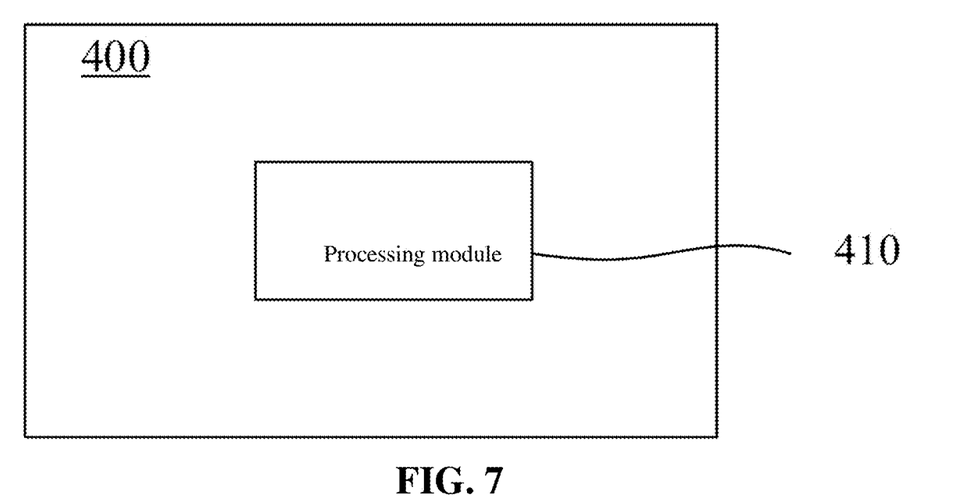
FIG. 7 is a schematic diagram of a detection device according to an embodiment of the present application.

FIG. 7 is a schematic diagram of a detection device according to an embodiment of the present application. As shown in FIG. 7, an embodiment of the present application provides a detection device 400, comprising a processing module 410, where the processing module 410 is configured to: obtain a to-be-detected image; obtain a plurality of confidence levels corresponding to a plurality of detection items according to the to-be-detected image; and determine a detection result of the to-be-detected image according to the plurality of confidence levels and a plurality of detection thresholds, wherein the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified.

In an embodiment, the processing module 410 is configured to: obtain first test data and second test data before determining a detection result of the to-be-detected image according to the plurality of confidence levels and the plurality of detection thresholds, and obtain a plurality of detection thresholds according to the first test data and the second test data, where the first test data is qualified data, and the second test data is unqualified data.

In an embodiment, the processing module 410 is configured to: obtain a plurality of prediction confidence levels and prediction results based on the first test data and the second test data, where the plurality of prediction confidence levels are corresponding to the plurality of detection items; obtain a plurality of detection thresholds according to the plurality of prediction confidence levels and the prediction results.

In an embodiment, the processing module 410 is configured to: determine a primary population of a genetic algorithm model according to the plurality of prediction confidence levels and the prediction results; obtain a non-inferior solution of the objective functions of the overkill rate and the missed detection rate by performing iteration according to the primary population based on objective functions of the overkill rate and the missed detection rate; determine a plurality of detection thresholds according to the non-inferior solution.

In an embodiment, the processing module 410 is configured to: determine a set of detection thresholds according to the non-inferior solution, where the set of detection thresholds includes multiple groups of non-inferior solutions; determine a plurality of detection thresholds according to a non-inferior solution corresponding to the minimum missed detection rate in the set of detection thresholds.

In an embodiment, the processing module 410 is configured to: perform iteration on the primary population through an elitist non-dominated sorting genetic algorithm so as to obtain a non-inferior solution of the objective functions of the overkill rate and the missed detection rate.

In an embodiment, the processing module 410 is configured to: determine a set of detection thresholds based on the value of the current independent variables in a case where the objective function of the overkill rate and the objective function of the missed detection rate are in the Pareto optimal state; determine a plurality of detection thresholds according to the set of detection thresholds.

In an embodiment, the processing module 410 is configured to: determine that the detection result is unqualified if the plurality of confidence levels are greater than at least one of the detection thresholds; or determine that the detection result is qualified if the plurality of confidence levels are less than or equal to each of the detection thresholds.

Figure 8:
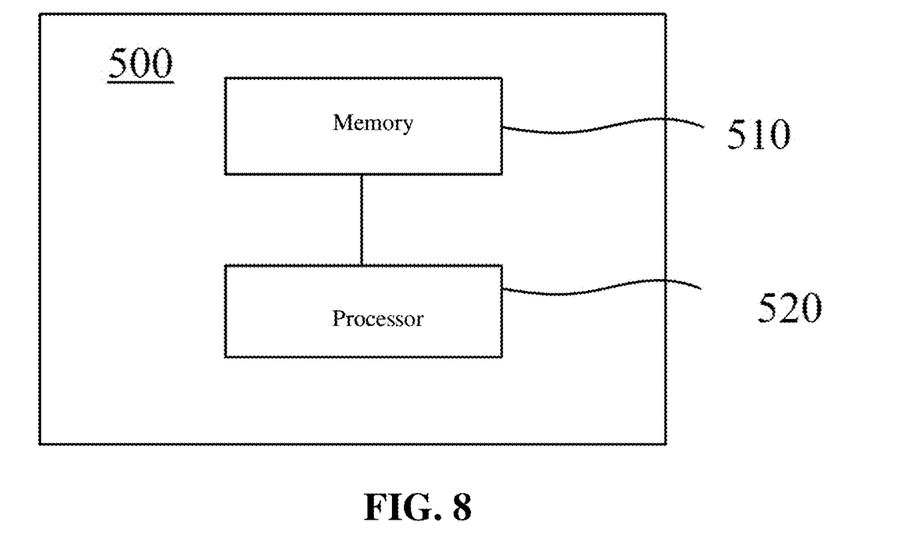
FIG. 8 is a schematic diagram of a detection device according to an embodiment of the present application.

FIG. 8 is a schematic diagram of a detection device according to an embodiment of the present application. As shown in FIG. 8, in an embodiment of the present application, the detection device 500 includes a memory 510 and a processor 520. The memory 510 is configured to store computer executable instructions; the processor 520 is configured to access the memory and execute the computer executable instructions to perform an operation in the detection method according to any one of the foregoing embodiments.

The processor 520 in the embodiment of the present application may be an integrated circuit chip with a signal processing capability. In an implementation process, steps in the foregoing method embodiments may be completed by using an integrated logic circuit of hardware in a processor or an instruction in the form of software. The processor may be a general purpose processor, a digital signal processor (DSP), an application specific integrated circuit (ASIC), a field programmable gate array (FPGA) or other programmable logic device, a discrete gate or transistor logic device, or a discrete hardware component. The methods and steps disclosed in the embodiments of the present application may be implemented or performed. The general purpose processor may be a microprocessor or the processor may be any conventional processor or the like. The steps of the method disclosed in the embodiments of the present application may be directly implemented by a hardware decoding processor, or may be implemented by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps of the foregoing method in combination with hardware of the processor.

The memory 510 in the embodiment of the present application may be a volatile memory or a non-volatile memory, or may include both of a volatile memory and a non-volatile memory. The non-volatile memory may be a read-only memory (ROM), a programmable ROM (PROM), an erasable PROM (EPROM), an electrically EPROM (EE-PROM), or a flash memory. The volatile memory may be a random access memory (RAM), which serves as an external cache. By way of example but not limitation, many forms of RAM may be used, such as static RAM (SRAM), dynamic RAM (DRAM), synchronous DRAM (SDRAM), double data rate DRAM (DDR SDRAM), enhanced SDRAM (ES-DRAM), synchlink DRAM (SLDRAM), and direct rambus RAM (DR RAM). It should be noted that the memory of the systems and methods described herein is intended to include, but is not limited to, these and any other suitable type of memory.

An embodiment of the present application provides a storage medium configured to store a computer program, when the computer program is executed by a computing device, the computing device is caused to implement the method according to any one of the foregoing embodiments.

While the present application has been described with reference to the preferred embodiments, various modifications may be made and components therein may be replaced with equivalents without departing from the scope of the present application. In particular, the technical features mentioned in the various examples can be combined in any manner as long as there is no structural conflict. The present application is not limited to the specific embodiments disclosed herein, but rather includes all technical solutions falling within the scope of the claims.

The invention claimed is:

1. A detection method, comprising:
obtaining a to-be-detected image;
obtaining a plurality of confidence levels corresponding to a plurality of detection items, which correspond to a plurality types of defects in the to-be-detected image; and
determining a detection result of the to-be-detected image according to the plurality of confidence levels and a plurality of detection thresholds, wherein the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified,
wherein before the determining a detection result of the to-be-detected image according to the plurality of confidence levels and a plurality of detection thresholds, the detection method further comprises:
obtaining first test data and second test data, wherein the first test data is qualified data, and the second test data is unqualified data; and
obtaining the plurality of detection thresholds according to the first test data and the second test data,
wherein the obtaining the plurality of detection thresholds according to the first test data and the second test data comprises:
obtaining a plurality of prediction confidence levels and prediction results according to the first test data and the second test data, the plurality of prediction confidence levels being corresponding to the plurality of detection items; and
obtaining the plurality of detection thresholds according to the plurality of prediction confidence levels and the prediction results, and
wherein the obtaining the plurality of detection thresholds according to the plurality of prediction confidence levels and the prediction results comprises:
determining a primary population of a genetic algorithm model according to the plurality of prediction confidence levels and the prediction result;
obtaining a non-inferior solution of the objective functions of the overkill rate and the missed detection rate by performing iteration according to the primary population based on the objective functions of the overkill rate and the missed detection rate; and
determining the plurality of detection thresholds according to the non-inferior solution.

2. The detection method according to claim 1, wherein independent variables of the objective functions of the overkill rate and the missed detection rate are corresponding to the plurality of detection items, and dependent variables of the objective functions of the overkill rate and the missed detection rate are the overkill rate and the missed detection rate.

3. The detection method according to claim 2, wherein the determining the plurality of detection thresholds according to the non-inferior solution comprises:
determining a set of detection thresholds according to the non-inferior solution, the set of detection thresholds including multiple groups of the non-inferior solutions; and
determining the plurality of detection thresholds according to the non-inferior solution corresponding to a minimum missed detection rate in the set of detection thresholds.

4. The detection method according to claim 3, wherein the non-inferior solution is a solution when the objective functions of the overkill rate and the missed detection rate are in the Pareto optimal state.

5. The detection method according to claim 1, wherein the obtaining a non-inferior solution of the objective functions of the overkill rate and the missed detection rate by performing iteration according to the primary population based on the objective functions of the overkill rate and the missed detection rate comprises:
obtaining a non-inferior solution of the objective functions of the overkill rate and the missed detection rate by performing iteration on the primary population through an elitist non-dominated sorting genetic algorithm.

6. The detection method according to claim 1, wherein the first test data is overkill data, and the overkill data is the data in which qualified ones are detected as defective in the first test data.

7. The detection method according to claim 1, wherein the quantity of the first test data is the same as the quantity of the second test data.

8. The detection method according to claim 1, wherein the determining a detection result of the to-be-detected image according to the plurality of confidence levels and a plurality of detection thresholds comprises:
determining the detection result as unqualified in a case where the plurality of confidence levels are greater than at least one of the detection thresholds; or
determining the detection result as qualified in a case where the plurality of confidence levels are less than or equal to each of the detection thresholds.

9. A detection device, comprising circuitry configured to:
obtain a to-be-detected image;
obtain a plurality of confidence levels corresponding to a plurality of detection items, which correspond to a plurality types of defects in the to-be-detected image; and
determine a detection result of the to-be-detected image according to the plurality of confidence levels and the plurality of detection thresholds, wherein the plurality of detection thresholds are corresponding to the plurality of detection items and are a non-inferior solution of objective functions of an overkill rate and a missed detection rate, the overkill rate is the ratio of qualified ones detected as defective, and the missed detection rate is the ratio of defective ones detected as qualified, wherein, before determining the detection result of the to-be-detected image according to the plurality of confidence levels and the plurality of detection thresholds, the circuitry is further configured to:

obtain first test data and second test data, and obtain a plurality of detection thresholds according to the first test data and the second test data, wherein the first test data is qualified data, and the second test data is unqualified data:

wherein, to obtain the plurality of detection thresholds according to the first test data and the second test data, the circuitry is configured to:

obtain a plurality of prediction confidence levels and prediction results according to the first test data and the second test data, the plurality of prediction confidence levels being corresponding to the plurality of detection items; and obtain the plurality of detection thresholds according to the plurality of prediction confidence levels and the prediction results, wherein, to obtain the plurality of detection thresholds according to the plurality of prediction confidence levels and the prediction results, the circuitry is configured to:

determine a primary population of a genetic algorithm model according to the plurality of prediction confidence levels and the prediction result;

obtain a non-inferior solution of the objective functions of the overkill rate and the missed detection rate by performing iteration according to the primary population based on the objective functions of the overkill rate and the missed detection rate; and determine the plurality of detection thresholds according to the non-inferior solution.

10. The detection device according to claim 9, wherein independent variables of the objective functions of the overkill rate and the missed detection rate are corresponding to the plurality of detection items, and dependent variables of the objective functions of the overkill rate and the missed detection rate are the overkill rate and the missed detection rate.

11. The detection device according to claim 10, wherein the circuitry is configured to:

determine a set of detection thresholds according to the non-inferior solution, the set of detection thresholds including multiple groups of the non-inferior solutions; and determine the plurality of detection thresholds according to the non-inferior solution corresponding to a minimum missed detection rate in the set of detection thresholds.

12. The detection device according to claim 11, wherein the non-inferior solution is a solution when the objective functions of the overkill rate and the missed detection rate are in the Pareto optimal state.

13. The detection device according to claim 9, wherein the circuitry is configured to: obtain a non-inferior solution of the objective functions of the overkill rate and the missed detection rate by performing iteration on the primary population through an elitist non-dominated sorting genetic algorithm.

14. The detection device according to claim 9, wherein the first test data is overkill data, and the overkill data is the data in which qualified ones are detected as defective in the first test data.

15. The detection device according to claim 9, wherein the quantity of the first test data is the same as the quantity of the second test data.

16. The detection device according to claim 9, wherein the circuitry is configured to:

determine the detection result as unqualified in a case where the plurality of confidence levels are greater than at least one of the detection thresholds; or determining the detection result as qualified in a case where the plurality of confidence levels are less than or equal to each of the detection thresholds.

17. A detection device, comprising:

a memory, configured to store computer executable instructions; and a processor, configured to access the memory and execute the computer executable instructions so as to perform operations in the method according to claim 1.

18. A non-transitory storage medium configured to store a computer program, wherein when the computer program is executed by a computing device, the computing device is caused to implement the method according to claim 1.

* * * * *